D. D. KIMEL.
Car-Brake.

No. 162,290.

Patented April 20, 1875.

Witnesses
Geo. R. Prichard
A. F. Parker

Inventor.
Dwight D. Kimel

THE GRAPHIC CO. PHOTO-LITH. 39 & 41 PARK PLACE, N.Y.

UNITED STATES PATENT OFFICE.

DWIGHT D. KIMEL, OF BEMENT, ILLINOIS.

IMPROVEMENT IN CAR-BRAKES.

Specification forming part of Letters Patent No. 162,290, dated April 20, 1875; application filed November 23, 1874.

*To all whom it may concern:*

Be it known that I, DWIGHT D. KIMEL, of Bement, in the county of Piatt and State of Illinois, have invented a new and useful apparatus for controlling the speed of railroad-cars or stopping them, done by means of three or more friction-wheels constructed of wood, metals, or rubber, entitled Kimel's Friction-Wheel Car-Brake; and I do hereby declare that the following is a full, clear, and exact description of the construction and operation of the same, reference being had to the annexed drawings, making part of this specification, in which—

Figure 1:
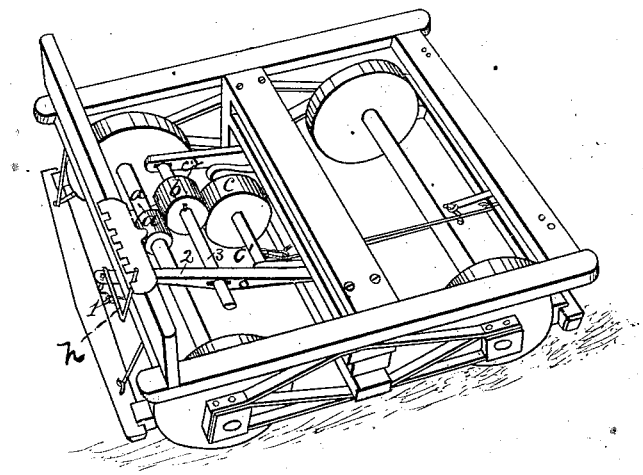
Figure 2:
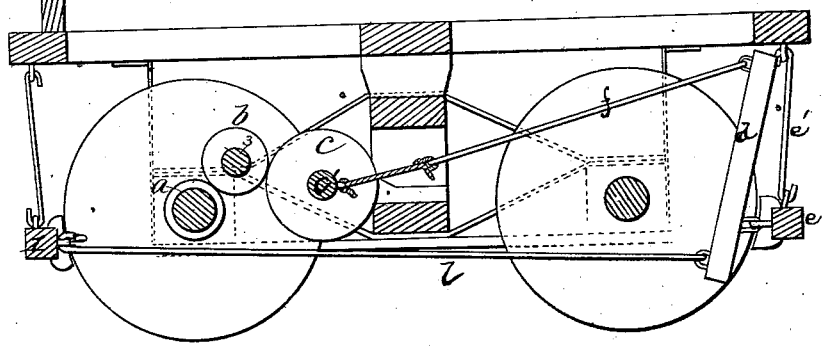

Figure 1 is a perspective view. Fig. 2 is a vertical longitudinal section of the same.

My invention relates to car-brakes, and the novelty consists in the construction and arrangement of the parts, as will be hereinafter more fully set forth.

In the accompanying drawings, $a$ indicates a collar on the front axle-shaft. $b$ is a loose friction-pulley on the shaft 3, attached to the arm $c^2$, the latter being firmly secured to the truck. The outer end of the shaft 3 passes through a perforation in the lever $o$, the inner end of which is pivoted to the truck and the outer end is provided with a bent lever, $h$, for the operating of the same. $c$ is a friction-pulley, securely attached to the shaft $c^1$, having its bearings in arms attached to the truck. 1 is a brake suspended from the track by means of links, and connected by a rod, $l$, with the vertical lever $d$ attached by a link with the rear brake $e$, which is connected with the track by means of links $e'$. The upper end of the lever $d$ is provided with a chain or rope, $f$, which is attached to windlass-shaft $c^1$. By operating the lever $h$, the friction-wheel $b$ is brought in contact with the wheels $a\ c$, which causes the chain $f$ to be wound around the shaft $c^1$, thus causing both brakes to be brought into operation.

I am aware that a roller, held normally out of contact with a grooved axle-wheel, and forced down upon said wheel when released, by the action of a spring, has heretofore been employed, in combination with another grooved wheel, brakes, brake-levers, and their connections, as shown in Letters Patent granted to J. C. Hosmer, dated April 20, 1862, and I therefore lay no claim to such invention.

What I claim as my invention, and desire to secure by Letters Patent, is—

The combination, with the rollers $a\ c$ of the loose roller $b$ on shaft 3, one end of which is attached to the bar $c^2$, the other end passing through a perforation in the pivoted lever $o$, to the outer end of which the engaging-arm $h$ of the rack-bar is attached, substantially as and for the purpose set forth.

DWIGHT D. KIMEL.

Witnesses:
  GEO. R. PINCKARD,
  A. F. PARKER.